US012613986B2

(12) United States Patent  
Matos et al.

(10) Patent No.: US 12,613,986 B2  
(45) Date of Patent: Apr. 28, 2026

(54) MACHINE LEARNING-BASED SYSTEM FOR DYNAMIC VARIABLE DETERMINATION AND LABELING

(71) Applicant: Bank of America Corporation, Charlotte, NC (US)

(72) Inventors: Marcus Matos, Richardson, TX (US); Vijaya L. Vemireddy, Plano, TX (US); Daniel Joseph Serna, The Colony, TX (US); Lee Ann Proud, St. Augustine, FL (US)

(73) Assignee: Bank of America Corporation, Charlotte, NC (US)

( * ) Notice: Subject to any disclaimer, the term of this patent is extended or adjusted under 35 U.S.C. 154(b) by 217 days.

(21) Appl. No.: 18/211,806

(22) Filed: Jun. 20, 2023

(65) Prior Publication Data

US 2024/0427916 A1    Dec. 26, 2024

(51) Int. Cl.  
*G06F 21/62* (2013.01)  
*G06N 20/00* (2019.01)

(52) U.S. Cl.  
CPC ......... *G06F 21/6218* (2013.01); *G06N 20/00* (2019.01)

(58) Field of Classification Search  
CPC ............................ G06F 21/6218; G06N 20/00  
See application file for complete search history.

(56) References Cited

U.S. PATENT DOCUMENTS

| | | | |
|---|---|---|---|
| 10,135,848 | B2 | 11/2018 | Muddu et al. |
| 11,016,834 | B2 | 5/2021 | Qiao et al. |
| 11,181,894 | B2 | 11/2021 | Cantrell |
| 11,410,041 | B2 | 8/2022 | Manjunath et al. |
| 11,586,681 | B2 * | 2/2023 | Kursun ............... G06F 16/9035 |
| 11,711,385 | B2 * | 7/2023 | Clark .................. G06F 21/6245 |
| 11,824,872 | B1 * | 11/2023 | Meyer ................. G06F 21/6245 |
| 2017/0063894 | A1 * | 3/2017 | Muddu ............... G06F 16/9024 |
| 2017/0134412 | A1 * | 5/2017 | Cheng .................. H04L 67/306 |
| 2021/0217014 | A1 * | 7/2021 | Shetty ............... G06Q 20/4014 |
| 2022/0207506 | A1 * | 6/2022 | Daruna ............... G06Q 20/407 |
| 2022/0394052 | A1 * | 12/2022 | Grossman-Avraham .................... G06F 21/50 |
| 2023/0403298 | A1 * | 12/2023 | Silva ................... H04L 63/1483 |
| 2023/0419402 | A1 * | 12/2023 | Ghelichi ................. G06N 5/01 |
| 2024/0020758 | A1 * | 1/2024 | Joglekar ................ G06F 18/22 |
| 2024/0259436 | A1 * | 8/2024 | Alexander ........... H04L 63/205 |
| 2025/0005121 | A1 * | 1/2025 | Cliche .................. G06F 21/316 |

\* cited by examiner

*Primary Examiner* — Shirley X Zhang

(74) *Attorney, Agent, or Firm* — Banner & Witcoff, Ltd.

(57) ABSTRACT

Arrangements for dynamic variable determination and labeling are provided. In some aspects, a computing platform may receive historical user data from a plurality of data sources. The computing platform may train, using the historical user data, a machine learning model to generate a plurality of dynamic variable profiles and evaluate data to detect potential unauthorized activity. One or more dynamic variable profiles of the generated plurality of dynamic variable profiles may be associated with a user. User specific data may be received and may include user identifying data and a request for a user event. The user specific data may be input to the machine learning model and, upon execution of the model, the model may output a determination of whether an anomaly exists in the user specific data. If an anomaly is detected, a mitigating action may be identified and transmitted to one or more computing devices for execution.

21 Claims, 10 Drawing Sheets

110

111

112

Dynamic Variable Control Computing Platform

Processor(s)

Memory(s)

Registration Module
112a

Internal Data Module
112b

External Data Module
112c

Machine Learning Engine
112d

Dynamic Variable Profile Module
112e

Mitigating Action Module
112f

Database
112g

113

Communication Interface(s)

MACHINE LEARNING-BASED SYSTEM FOR DYNAMIC VARIABLE DETERMINATION AND LABELING

BACKGROUND

Aspects of the disclosure relate to electrical computers, systems, and devices for providing dynamic variable determination and labeling to prevent unauthorized access to data.

As the use of synthetic identities increases, the need to quickly and efficiently identify discrepancies in data and potential unauthorized activity also increased. While the use of authentication may aid in protecting user data, authentication data may be obtained by unauthorized users or personal data may be obtained through other unauthorized means and used to established synthetic identities and/or perpetuate unauthorized activity. Accordingly, it would be advantageous to provide a system for analyzing variable-specific user data to detect potential unauthorized activity.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with preventing unauthorized access to secure data.

In some aspects, a computing platform may receive historical user data from a plurality of data sources. In some examples, the data sources may internal to an enterprise organization or external to the enterprise organization. The computing platform may train, using the historical user data, a machine learning model to generate a plurality of dynamic variable profiles and evaluate data to detect potential unauthorized activity. In some examples, one or more dynamic variable profiles of the generated plurality of dynamic variable profiles may be associated with a user (e.g., based on variables corresponding to the user).

In some examples, user specific data may be received. The user specific data may include user identifying data and a request for a user event. The user specific data may further include event details such as type, amount, parties to the event, or the like. The user specific data may be input to the machine learning model and, upon execution of the machine learning model, the machine learning model may output a determination of whether an anomaly exists in the user specific data (e.g., as compared to the one or more associated dynamic variable profiles). If an anomaly is not detected, the requested user event may be processed.

If an anomaly is detected, one or more mitigating actions may be identified. The one or more mitigating actions may be transmitted to one or more computing devices for execution. In some examples, the machine learning model may be updated and/or validated based on the detected anomaly and/or the one or more mitigating actions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, unauthorized actors are generating synthetic identities (e.g., identities fabricated from credentials obtained in an unauthorized manner and/or not associated with a real person) based on personal information of one or more users. Accordingly, when an unauthorized actor attempts to execute an event, such as process a transaction, open an account, or the like, it may be difficult for enterprise organizations to identify the identity of the user as synthetic because the identity may be based on actual user data (just not, e.g., associated with that user). Aspects described herein reduce or eliminate the ability of unauthorized actors to execute events using synthetic identities by evaluating, in real-time or near real-time and using machine learning, data provided by the user to determine whether it meets expected values for different variables of the user.

For instance, aspects described herein include training a machine learning model to generate a plurality of dynamic variable profiles. In some examples, each profile may be associated with a different user variable. Accordingly, a given user may have one or more dynamic variable profiles that apply to that user and are associated with that user.

When a user attempts to execute an event (e.g., transaction, account opening, or the like), the data associated with the event, as well as user identifying data, may be input to the machine learning model. The model may then be executed to output a determination of whether an anomaly exists as compared to the one or more dynamic variable profiles associated with that user. The anomaly may indicate potential unauthorized activity. Accordingly, the user and/or event may be flagged and one or more mitigating actions may be identified and executed.

These and various other arrangements will be discussed more fully below.

Figure 1A:
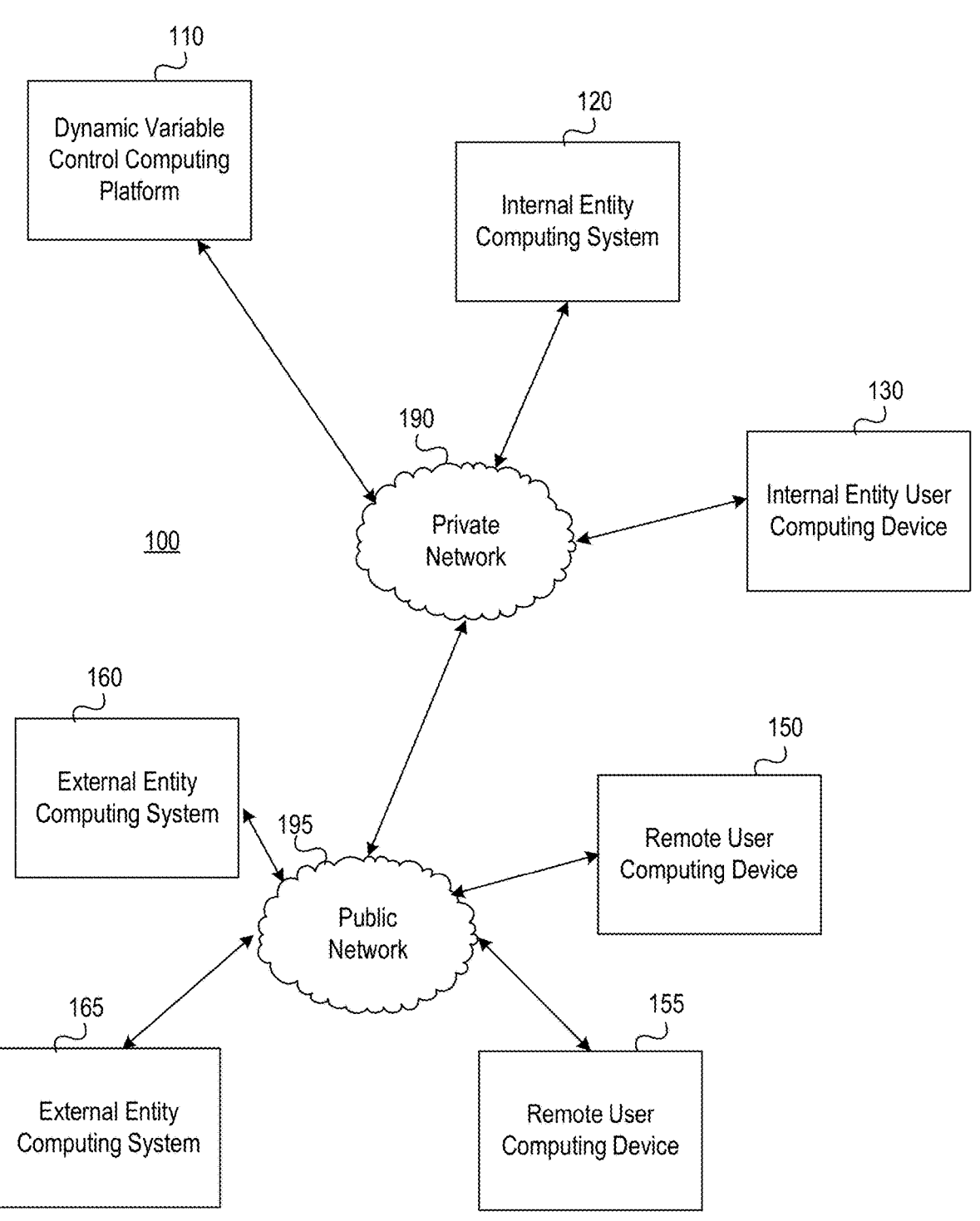
FIGS. 1A-1B depict an illustrative computing environment for implementing dynamic variable determination and labeling in accordance with one or more aspects described herein.
Figure 1B:
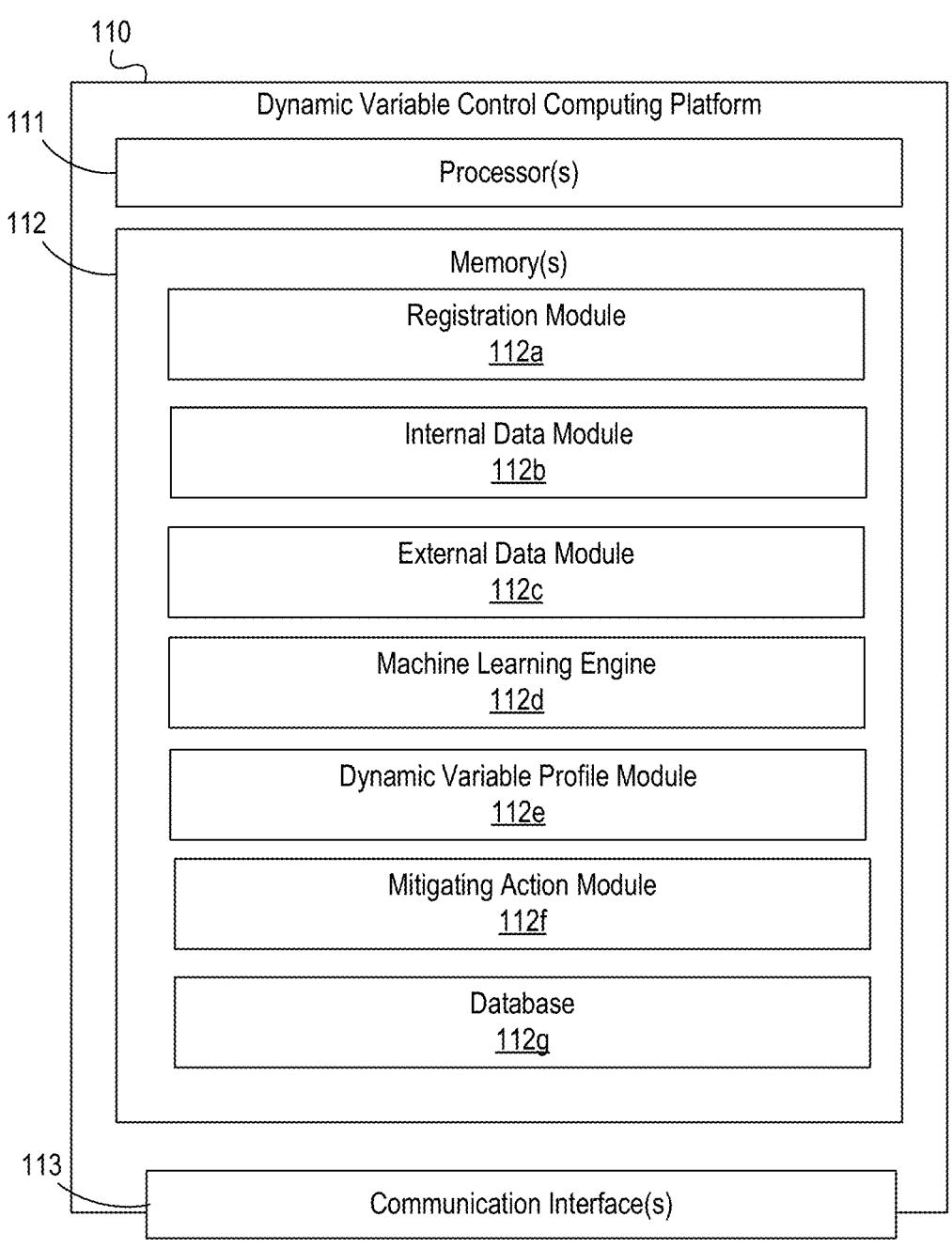

Aspects described herein may be implemented using one or more computing devices operating in a computing environment. For instance, FIGS. 1A-1B depict an illustrative computing environment for implementing dynamic variable determination and labeling functions in accordance with one or more aspects described herein. Referring to FIG. 1A, computing environment 100 may include one or more computing devices and/or other computing systems. For example, computing environment 100 may include dynamic variable control computing platform 110, internal entity computing system 120, internal entity user computing device 130, remote user computing device 150, remote user computing device 155, external entity computing system 160 and external entity computing system 165. Although one internal entity computing system 120, one internal entity user computing device 130, two remote user computing devices 150, 155, and two external entity computing systems 160, 165 are shown, any number of devices or systems may be used without departing from the invention.

Dynamic variable control computing platform 110 may be or include one or more computing devices (e.g., servers, server blades, or the like) and/or one or more computing components (e.g., memory, processor, and the like) and may be configured to provide dynamic, efficient dynamic variable identification and labeling. In some examples, dynamic variable control computing platform 110 may receive historical data associated with a plurality of users. For instance, data associated with user products or services, user identifying data that has been self-reported, transaction history data, data from external sources (e.g., publicly available records (e.g., tax records, or the like), social media data, and the like), and the like, may be received and used to train a machine learning model. In some examples, a web crawler may be used to retrieve data associated with particular users from external data sources. The machine learning model may be used to generate a plurality of dynamic variable profiles. In some examples, each profile may be associated with a user variable, such as job role, education, family status, and the like. One or more profiles may be associated with a user and used to identify potential unauthorized activity.

For instance, dynamic variable control computing platform 110 may receive user specific data associated with a user. In some examples, the user specific data may be associated with a requested user event, such as opening a new account, obtaining a product, or the like. The machine learning model may receive the user specific data as inputs and, based on execution of the machine learning model, output a determination of whether an anomaly exists in at least one dynamic variable profile of the one or more dynamic variable profiles associated with the user. If no anomalies are detected, the request for user event may be processed.

If an anomaly is detected, dynamic variable control computing platform 110 may flag the requested user event for further analysis, may identify and execute one or more mitigating actions, or the like. The machine learning model may be updated or validated based on the detected anomaly, mitigating actions, and the like, to provide continuous improvement in accuracy.

Internal entity computing system 120 may be or include one or more computing devices (e.g., servers, server blades, or the like) and/or one or more computing components (e.g., memory, processor, and the like) and may host or execute one or more enterprise organization applications, systems, or the like. Accordingly, internal entity computing system 120 may store user information (e.g., transaction data, product data, and the like) that may be used to train the machine learning model. User data may be received by the dynamic variable control computing platform 110 from the internal entity computing system 120 and used to train the machine learning model. Further, internal entity computing system 120 may, in some examples, receive and execute one or more mitigating actions (e.g., deny access to an account, preventing opening of an account, or the like), based on a detected anomaly.

Internal entity user computing device 130 may be or include one or more computing devices, such as desktop computers, laptop computers, tablet computers, smartphones, wearable devices such as smart watches or augmented reality glasses, or the like. In some examples, internal entity user computing device 130 may be associated with an employee of the enterprise organization implementing the dynamic variable control computing platform 110 and used to evaluate or further analyze detected anomalies. In some examples, internal entity user computing device may be an administrator computing device.

In some examples, internal entity user computing device 130 may be or include a customer service associate computing device (e.g., an employee computing device, an automated customer service system device, or the like). Accordingly, a user may request an event via a telephone channel, in-person channel, or the like. The customer service associate may input the data to the dynamic variable control computing platform 110 via the internal entity user computing device 130 for processing.

Remote user computing device 150 and/or remote user computing device 155 may be or include computing devices such as desktop computers, laptop computers, tablets, smartphones, wearable devices, and the like, that may be associated with a user (e.g., a customer or potential customer of the enterprise organization). The remote user computing device 150 and/or remote user computing device 155 may be used to request a service or product, request a transaction, or request another type of user event. In some examples, the requests may be made via a mobile application executing on the remote user computing device 150, 155, or an online application accessed via the remote user computing device 150, 155.

External entity computing system 160 and/or external entity computing system 165 may be or include computing devices, components, and the like, associated with an entity external to or different from the enterprise organization. External entity computing system 160 and/or external entity computing system 165 may store publicly available data, social media data, or the like, that may be used to train a machine learning model, generate one or more dynamic variable profiles, or the like.

As mentioned above, computing environment 100 also may include one or more networks, which may interconnect one or more of dynamic variable control computing platform 110, internal entity computing system 120, internal entity user computing device 130, remote user computing device 150, remote user computing device 155, external entity computing system 160 and external entity computing system 165. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, dynamic variable control computing platform 110, internal entity computing system 120, and/or internal entity user computing device 130, may be associated with an enterprise organization (e.g., a financial institution), and private network 190 may be associated with and/or operated by the organization, and may include one or more networks (e.g., LANs, WANs, virtual private networks (VPNs), or the like) that interconnect dynamic variable control computing platform 110, internal entity computing system 120, and/or internal entity user computing device 130, and one or more other computing devices and/or computer systems that are used by, operated by, and/or otherwise associated with the organization. Public network 195 may connect private network 190 and/or one or more computing devices connected thereto (e.g., dynamic variable control computing platform 110, internal entity computing system 120, internal entity user computing device 130) with one or more networks and/or computing devices that are not associated with the organization. For example, remote user computing device 150, remote user computing device 155, external entity computing system 160 and/or external entity computing system 165 might not be associated with an organization that operates private network 190 (e.g., because remote user computing device 150, remote user computing device 155, external entity computing system 160 and/or external entity computing system 165 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect remote user computing device 150, remote user computing device 155, external entity computing system 160 and/or external entity computing system 165 to private network 190 and/or one or more computing devices connected thereto (e.g., dynamic variable control computing platform 110, internal entity computing system 120, internal entity user computing device 130).

Referring to FIG. 1B, dynamic variable control computing platform 110 may include one or more processors 111, memory 112, and communication interface 113. A data bus may interconnect processor(s) 111, memory 112, and communication interface 113. Communication interface 113 may be a network interface configured to support communication between dynamic variable control computing platform 110 and one or more networks (e.g., network 190, network 195, or the like). Memory 112 may include one or more program modules having instructions that when executed by processor(s) 111 cause dynamic variable control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of dynamic variable control computing platform 110 and/or by different computing devices that may form and/or otherwise make up dynamic variable control computing platform 110.

For example, memory 112 may have, store and/or include registration module 112a. Registration module 112a may store instructions and/or data that may cause or enable the dynamic variable control computing platform 110 to receive registration data. In some examples, the registration data may include identification of one or more internal systems or devices (e.g., internal entity computing system 120) that may have or store user information, one or more external systems or devices (e.g., external entity computing system 160, external entity computing system 165, or the like) that may have or store user information, and the like. In some examples, particular devices to access may be registered to enable dynamic variable control computing platform 110 to access data to train the machine learning model, generate a plurality of dynamic variable profiles, and the like.

Dynamic variable control computing platform 110 may further have, store and/or include internal data module 112b. Internal data module 112b may store instructions and/or data that may cause or enable the dynamic variable control computing platform 110 to receive internal data from one or more internal systems or devices, such as internal entity computing system 120. The data may be received in a data stream, via a batch transfer process, or the like. The data may be used to train a machine learning model, generate dynamic variable profiles, and the like. In some examples, internal data module 112b may receive additional, user specific data related to a request for a user event. For instance, internal data module 112b may receive data from a user event request that is provided by the user (e.g., name, identifier, occupation, address, and the like), pre-stored data associated with existing customers of the enterprise organization (e.g., transaction history, products or services, and the like). This information may be processed as inputs in the machine learning model to identify potential anomalies in the user event request.

Dynamic variable control computing platform 110 may further have, store and/or include external data module 112c. External data module 112c may store instructions and/or data that may cause or enable the dynamic variable control computing platform 110 to receive external data from one or more external systems or devices, such as external entity computing system 160, external entity computing system 165, or the like. The data may be received in a data stream via a batch transfer process, or the like. The data may be used to train a machine learning model, generate dynamic variable profiles, and the like. In some examples, external data module 112c may receive additional, user specific data related to a request for a user event. For instance, external data module 112c may receive data related to a requested user event that is retrieved based on, for instance, information provided by the user, or the like. For instance, based on a user providing a name, address, or the like, publicly available information associated with the user may be retrieved from one or more external system and received by the external data module 11c. This information may be processed as inputs in the machine learning model to identify potential anomalies in the user event request.

Dynamic variable control computing platform 110 may further have, store and/or include machine learning engine 112d. Machine learning engine 112d may store instructions and/or data that may cause or enable the dynamic variable control computing platform to train, execute, validate and/or update one or more machine learning models that may be used to generate or build dynamic variable profiles, evaluate user specific data and user event requests for potential unauthorized activity, and the like. In some examples, the machine learning model may be trained (e.g., using data received from one or more internal data sources, external data sources, and the like) to identify patterns or sequences in data to identify or generate a plurality of dynamic variable profiles and identify patterns or sequences in data that may indicate potential unauthorized activity. For instance, based on generated dynamic variable profiles (e.g., each profile being associated with a different user variable), the machine learning model may be trained to compare user specific data related to a user event request to one or more dynamic variable profiles associated with the user to determine whether the user event request includes an anomaly or potential unauthorized activity.

For instance, the machine learning model may receive, as inputs, user specific data associated with a user request. In some examples, the user request may include a request for a transaction (e.g., withdrawal, deposit, funds transfer, or the like), a request to open a new account, a request to close an account, a request to obtain a new product or service, or the like. The user request data, as well as user specific data received from the user and, in some examples, retrieved from internal sources (e.g., internal entity computing system 120) and/or external sources (e.g., external entity computing system 160, external entity computing system 165, or the like) may be input into the machine learning model and, based on execution of the model, an output indicating whether an anomaly is detected (e.g., an anomaly in the current user data as compared to the one or more dynamic variable profiles associated with the user that may indicate potential unauthorized activity). The determination, as well as any mitigating actions identified and executed, may be received by the machine learning model (e.g., via a feedback loop) to update, validate, refine, or further train the machine learning model. Accordingly, the model may be continuously or near continuously updated or validated to continue to improve accuracy.

In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models. In some examples, training the machine learning model may include training the model using labeled data (e.g., data labeled to indicate an associated dynamic variable, a successful outcome, or the like).

Dynamic variable control computing platform 110 may further have, store and/or include dynamic variable profile module 112*e*. Dynamic variable profile module 112*e* may store instructions and/or data that may cause or enable the dynamic variable control computing platform 110 to associate one or more generated dynamic variable profiles (e.g., generated by the machine learning engine 112*d*) with a user. For instance, users may be evaluated to identify one or more categories of user (e.g., marital status, level of education, type of education, job role, family status, or the like). Based on the identified categories, one or more dynamic variable profiles may be identified and associated with the user. Each dynamic variable profile may provide a machine learning generated profile of expected actions or events for a particular variable. For instance, a user having two children in their early teens may be categorized as a parent of teens and dynamic variable profiles for "parents" and "teen children" may be identified and associated with the user. In another example, a user with a bachelor's degree in data science may be categorized by education level and with expertise in data science and dynamic variable profiles associated with those variables may be associated with the user. Various other examples may be used without departing from the invention.

Dynamic variable control computing platform 110 may further have, store and/or include mitigating action module 112*f*. Mitigating action module 112*f* may store instructions and/or data that may cause or enable the dynamic variable control computing platform 110 to identify one or more mitigating actions based on an output indicating unauthorized activity or potential unauthorized activity. For instance, if an output of the machine learning model indicates that there is potential unauthorized activity (e.g., an anomaly has been detected), mitigating action module 112*f* may receive that output and identify one or more mitigating actions to execute. For instance, mitigating action module 112*f* may identify that the anomaly should be assigned to an analyst for review. In another example, mitigating action module 112*f* may identify that a user should not be able to access an account until a triggering event is detected (e.g., additional authentication information is provided, a user visits a banking center, or the like), the requested user event should be denied, or the like. In some examples, mitigating action module 112*f* may generate an instruction causing the mitigating action to be executed and may send the mitigating action to one or more systems or devices for execution.

Dynamic variable control computing platform 110 may further have, store and/or include database 112*g*. Database 112*g* may store data associated with one or more dynamic variable profiles, data associated with a machine learning model, and/or other data that enables performance of the aspects described herein by the dynamic variable control computing platform 110.

FIGS. 2A-2F depict one example illustrative event sequence for implementing dynamic variable determination and labeling in accordance with one or more aspects described herein. The events shown in the illustrative event sequence are merely one example sequence and additional events may be added, or events may be omitted, without departing from the invention. Further, one or more processes discussed with respect to FIGS. 2A-2F may be performed in real-time or near real-time.

Figure 2A:
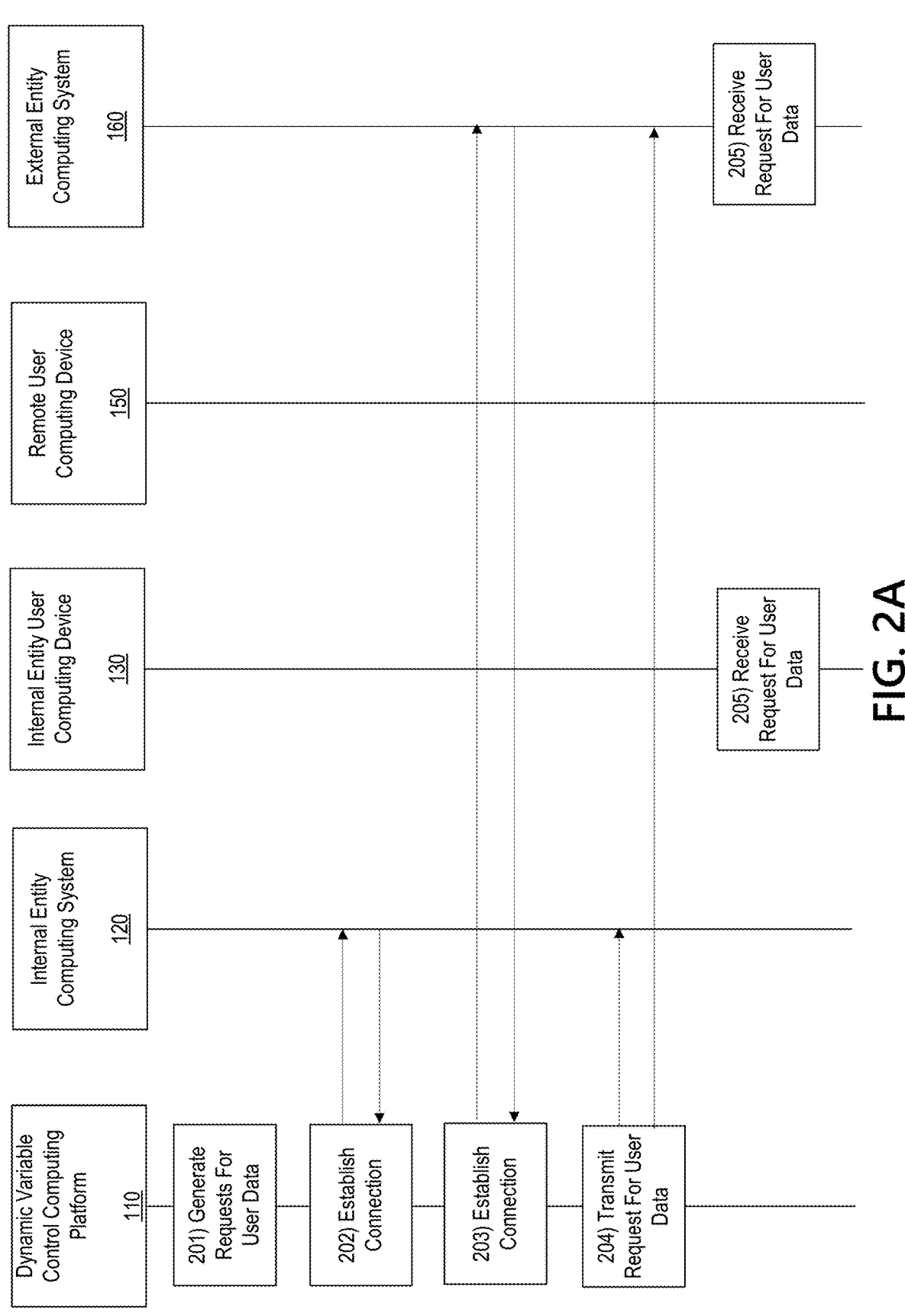
FIGS. 2A-2F depict an illustrative event sequence for implementing dynamic variable determination and labeling in accordance with one or more aspects described herein.

With reference to FIG. 2A, at step 201, dynamic variable control computing platform 110 may generate one or more requests for user data. For instance, dynamic variable control computing platform 110 may generate one or more requests for user transaction data, product data, publicly available data, and the like.

At step 202, dynamic variable control computing platform 110 may establish a connection with the internal entity computing system 120. For instance, a first wireless connection may be established between the dynamic variable control computing platform 110 and the internal entity computing system 120. Upon establishing the first wireless connection, a communication session may be initiated between the dynamic variable control computing platform 110 and the internal entity computing system 120.

At step 203, dynamic variable control computing platform 110 may establish a connection with the external entity computing system 160. For instance, a second wireless connection may be established between the dynamic variable control computing platform 110 and the external entity computing system 160. Upon establishing the second wireless connection, a communication session may be initiated between the dynamic variable control computing platform 110 and the external entity computing system 160.

At step 204, dynamic variable control computing platform 110 may transmit or send the requests for user data to one or more of the internal entity computing system 120 and external entity computing system 160. For instance, dynamic variable control computing platform 110 may transmit or send the request for user data to the internal entity computing system 120 during the communication session initiated upon establishing the first wireless connection, and the external entity computing system 160 during the communication session initiated upon establishing the second wireless connection. In some examples, transmitting or sending the request for user data may cause the receiving device to execute the request.

At step 205, the request for user data may be received by one or more of internal entity computing system 120 and external entity computing system 160.

Figure 2B:
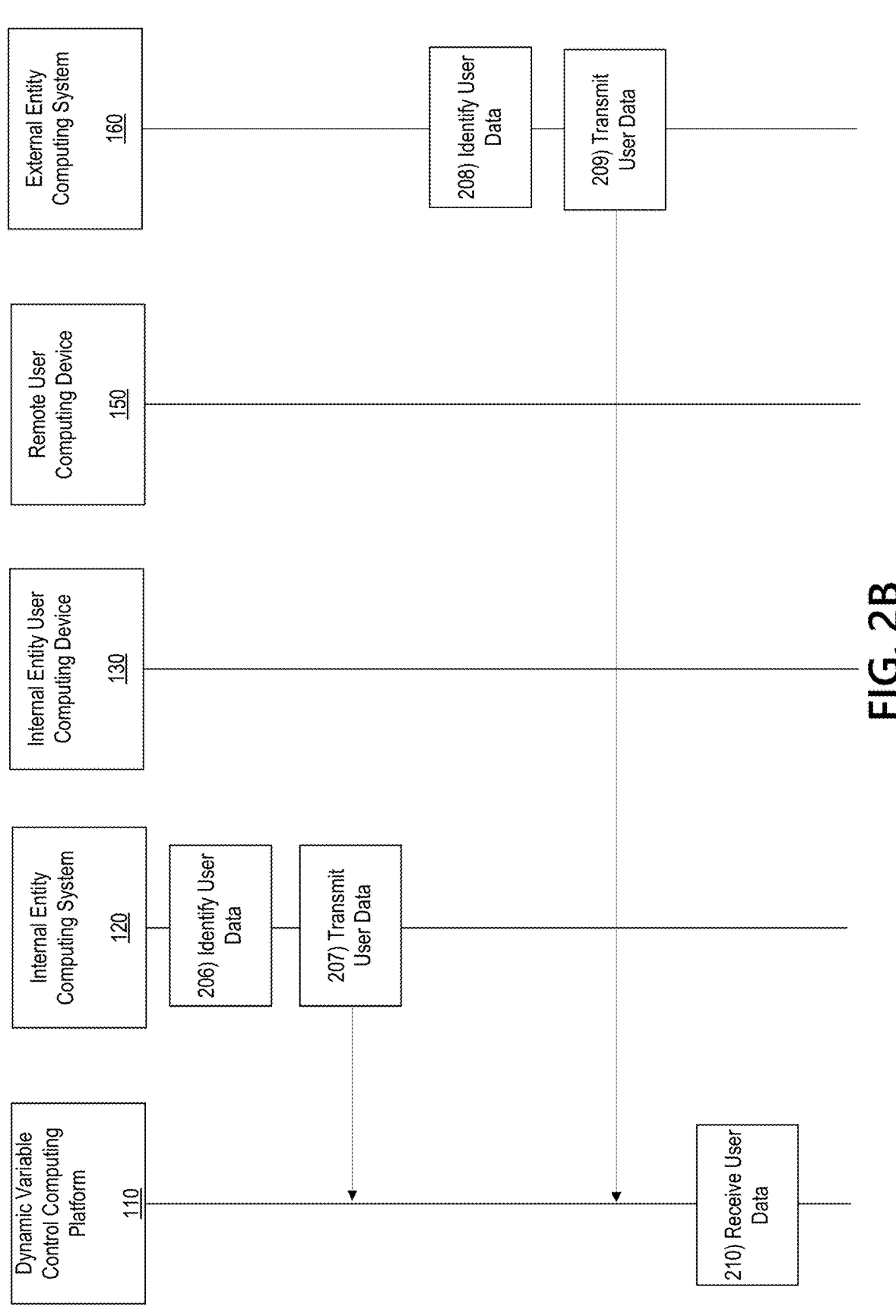

With reference to FIG. 2B, at step 206, internal entity computing system 120 may identify user data responsive to the request for user data. At step 207, the user data responsive to the request for user data may be transmitted or sent to the dynamic variable control computing platform 110.

At step 208, external entity computing system 160 may identify user data responsive to the request for user data. At step 209, the user data responsive to the request for user data may be transmitted or sent to the dynamic variable control computing platform 110.

At step 210, dynamic variable control computing platform 110 may receive the user data sent by the internal entity computing system 120 and/or the external entity computing system 160.

Figure 2C:
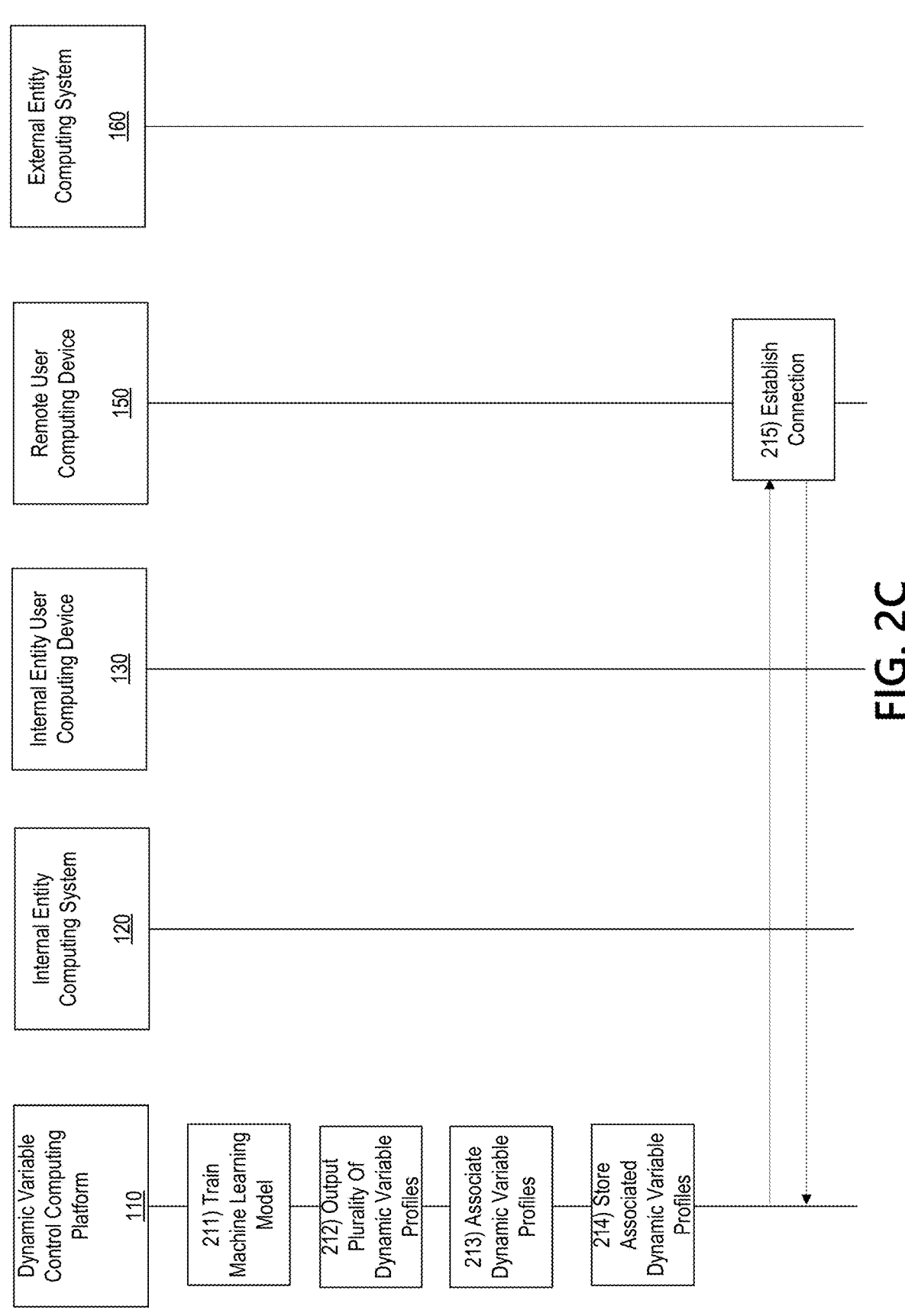

With reference to FIG. 2C, at step 211, dynamic variable control computing platform 110 may train the machine learning model using the received user data. In some examples, training the machine learning model may include labeling the received data (e.g., type of data, category of user, products or services owned or obtained, and the like) in order to train the model to identify patterns or sequences in data, generate dynamic variable profiles, output detected anomalies, and the like.

At step 212, the machine learning model may generate or build a plurality of dynamic variable profiles. For instance, the machine learning model may be used to identify sequences or patterns in the data to identify categories of users based on a particular dynamic variable (e.g., family status, job role, or the like) and identify expected transactions or events for users in that category of variable. For instance, a dynamic variable profile for a retired user may indicate that expected behaviors include purchases for travel, insurance, or like. However, if a user associated with this profile requests to open an education savings account, that may be outside of an expected event for that profile and may be flagged for mitigating action. Various other examples may be used without departing from the invention.

At step 213, the dynamic variable control computing platform 110 may associate one or more dynamic variable profiles with one or more users. For instance, customers or users of the enterprise organization may be categories (e.g., based on user data associated with each user) to identify variables that apply to each user and a profile for the variables that apply to each user. Accordingly, each user may have one or more dynamic variable profiles associated with the user to identify potential unauthorized activity based on various factors, variables, and the like.

At step 214, the dynamic variable profiles associated with each user may be stored with each user or otherwise lined to each user to which they apply.

At step 215, remote user computing device 150 may establish a connection with the dynamic variable control computing platform 110. For instance, a third wireless connection may be established between the remote user computing device 150 and the dynamic variable control computing platform 110. Upon establishing the third wireless connection, a communication session may be initiated between the remote user computing device 150 and the dynamic variable control computing platform 110.

Figure 2D:
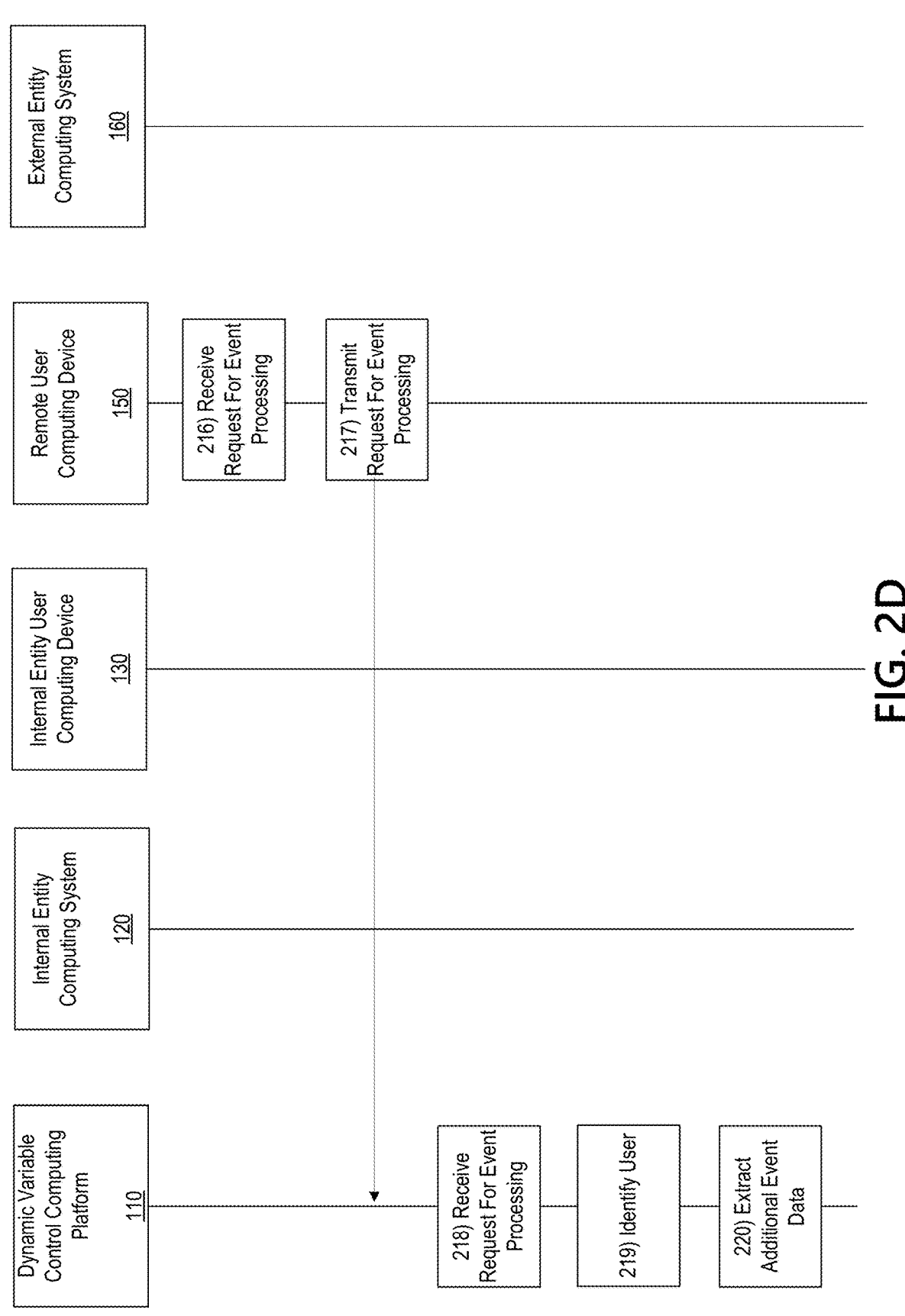

With reference to FIG. 2D, at step 216, remote user computing device 150 may receive a request for event processing. For instance, remote user computing device 150 may receive, e.g., via a touchscreen or other input device, a request to process a user event. In some examples, the user event may include a transaction, a request to open a new account, a request to obtain a product or service, or the like. The request to process the user event may be received by a mobile application executing on the remote user computing device 150, by an online application, or the like. The request for event processing may include identification of a type of event, amount of event, parameters of the event, or the like.

At step 217, remote user computing device 150 may transmit or send the request for event processing to the dynamic variable control computing platform 110. For instance, the request for event processing may be transmitted or sending during the communication session initiated upon establishing the third wireless connection.

At step 218, dynamic variable control computing platform 110 may receive the request for event processing and may process the request. For instance, at step 219, a user associated with the request for event processing may be identified. For instance, the event request may identify a user or provide other user identifying information, or may include data that enables the dynamic variable control computing platform 110 to identify the user from other data (e.g., a device from which the request was received may be a pre-registered device, authentication data from the mobile application may be received and used to identify the user, or the like).

Although aspects describe associating one or more dynamic variable profiles with users prior to receiving an event request, in some examples, (e.g., if the user requesting the event is not a current customer of the enterprise organization), one or more dynamic variable profiles may be identified and associated with the user based on user-provided information in the event request (e.g., name, address, job role, or the like).

At step 220, dynamic variable control computing platform 110 may extract additional details associated with the user, requested event, and the like, from the event request. For instance, any additional information associated with the user (e.g., address, phone number, and the like) may be extracted. Additionally or alternatively, event details such as type of event, amount of event, or the like, may be extracted.

In some examples, extracting additional details associated with the user and requested event may include requesting additional user specific data from one or more internal sources (e.g., internal entity computing system 120) and/or external sources (e.g., external entity computing system 160). For instance, transaction data may be requested from internal sources, while publicly available data or social media data may be requested from external sources. In some examples, a web crawler may be used to identify additional data associated with the user that may be used, for instance, in analyzing the event request, in identifying one or more dynamic variable profiles to associate with the user, or the like.

Figure 2E:
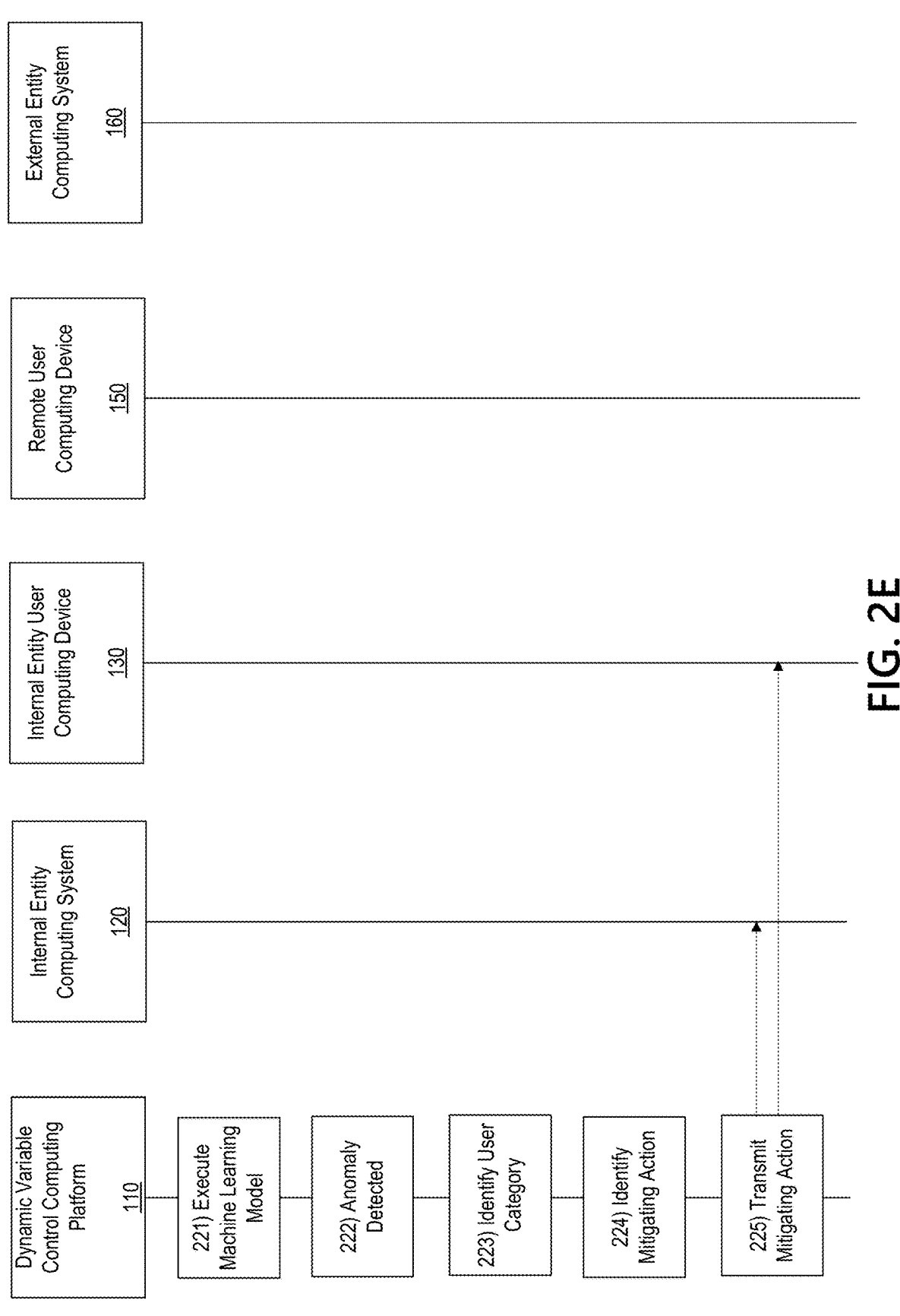

With reference to FIG. 2E, at step 221, dynamic variable control computing platform 110 may execute the machine learning model. For instance, the user identifying data, as well as extracted user and event data, and/or one or more associated dynamic variable profiles associated with the user may be input into the machine learning model. The model may be executed to output a determination of whether potential unauthorized activity is present in the event request. In some examples, executing the machine learning model may include identifying the one or more dynamic variable profiles associated with the user for analysis, and determining whether an anomaly exists between the user data and event data and expected data in the one or more dynamic variable profiles associated with the user.

At step 222, dynamic variable control computing platform 110 may detect an anomaly. For instance, the machine learning model may output an indication that an anomaly was detected and, accordingly, unauthorized activity may be present in the event request.

At step 223, responsive to the detected anomaly, dynamic variable control computing platform 110 may identify a category of user (e.g., current customer or new/potential customer), a category of data in which the anomaly was detected (e.g., user-provided data, external data, internal data or the like).

At step 224, dynamic variable control computing platform 110 may identify one or more mitigating actions. For instance, dynamic variable control computing platform 110 may identify one or more mitigating actions to execute based on the detected anomaly. In some examples, mitigating actions may include forwarding the event request to an analyst computing device for evaluation. Additionally or alternatively, the event request may be denied, access to one or more user accounts may be limited or prevented until a triggering action occurs, or the like.

In some examples, the mitigating action may be identified based on a category of user or category of data in which the anomaly was detected. For instance, if the user is an existing customer and the anomaly is in self-reported data, this may indicate an unauthorized user is attempting to user a synthetic identification to request the event. Accordingly, mitigating actions may include limiting access to one or more accounts until it is confirmed (e.g., via pre-registered contact or other data) that the authorized user is making the event request. In another example, if the user is a new customer and the anomaly is in external data, the mitigating action may include requesting additional data from the user to confirm whether the activity is actually unauthorized. Various other arrangements for using the category of user and data to identify a mitigating action may be used without departing from the invention.

At step 225, dynamic variable control computing platform 110 may generate an instruction to execute the mitigating action and may transmit or send the instruction to one or more computing devices or systems. In some examples, transmitting or sending the instruction may cause the receiving device or system to executing the mitigating action. For instance, an instruction to executing a mitigating action may be transmitted or sent to one or more of internal entity computing system 120 (e.g., to executing limits on existing accounts, prevent new account opening, or the like) and/or internal entity user computing device 130 (e.g., to initiate an investigation or further analysis of the event request and potential unauthorized activity).

Figure 2F:
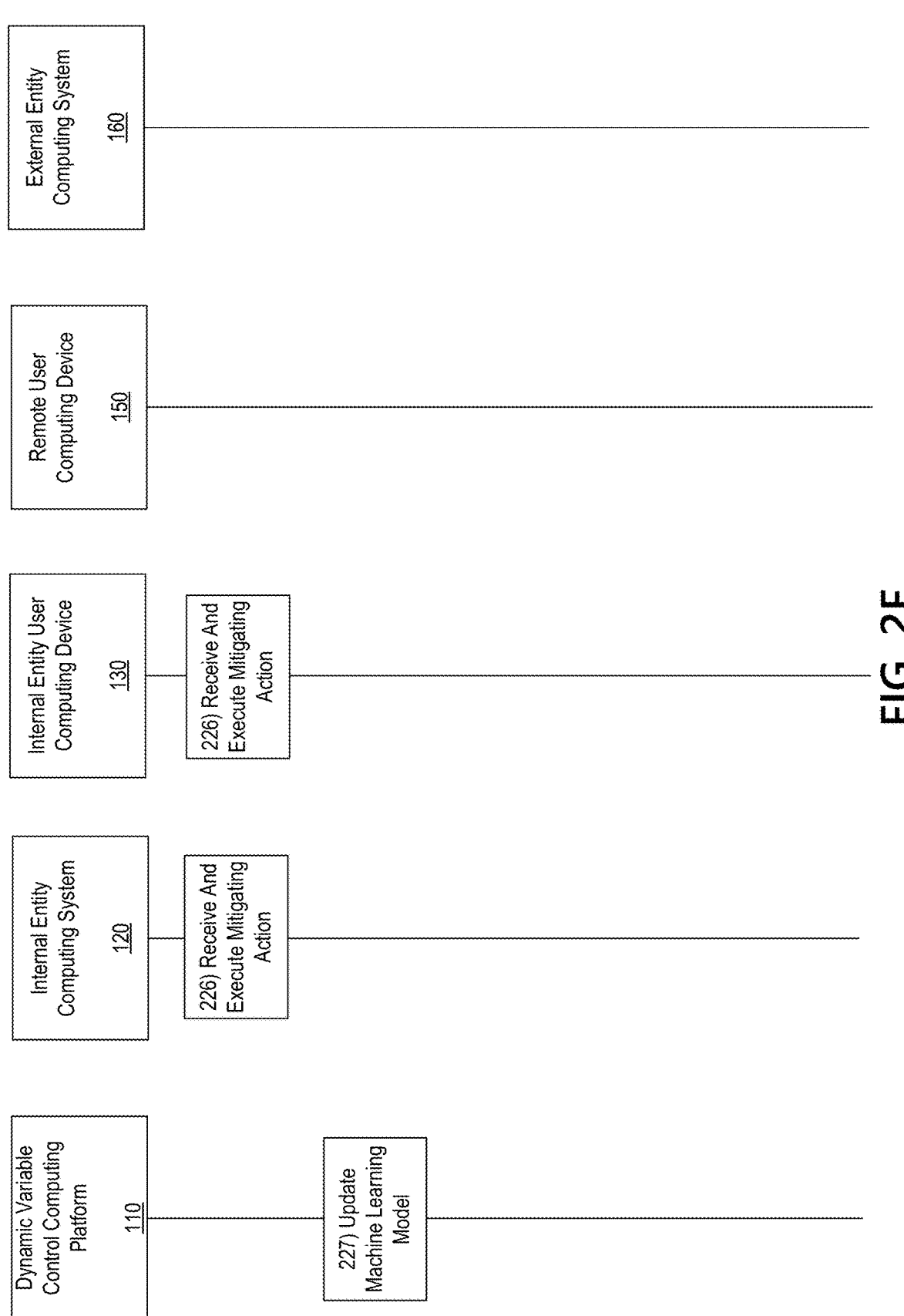

With reference to FIG. 2F, at step 226, one or more internal entity computing system 120 and internal entity user computing device 130 may receive the mitigating action and execute the mitigating action. In some examples, executing the mitigating action may cause the internal entity computing system 120 and/or internal entity user computing device 130 to modify limits of an account, prevent access to accounts, enable additional security requirements (e.g., multi-factor authentication), or the like.

At step 227, dynamic variable control computing platform 110 may update and/or validate the machine learning model based on the detected anomaly, as well as executing mitigation actions (e.g., based on a dynamic feedback loop). Accordingly, the machine learning model may be continuously, or near-continuously, updated to improve accuracy in detecting anomalous data.

Figure 3:
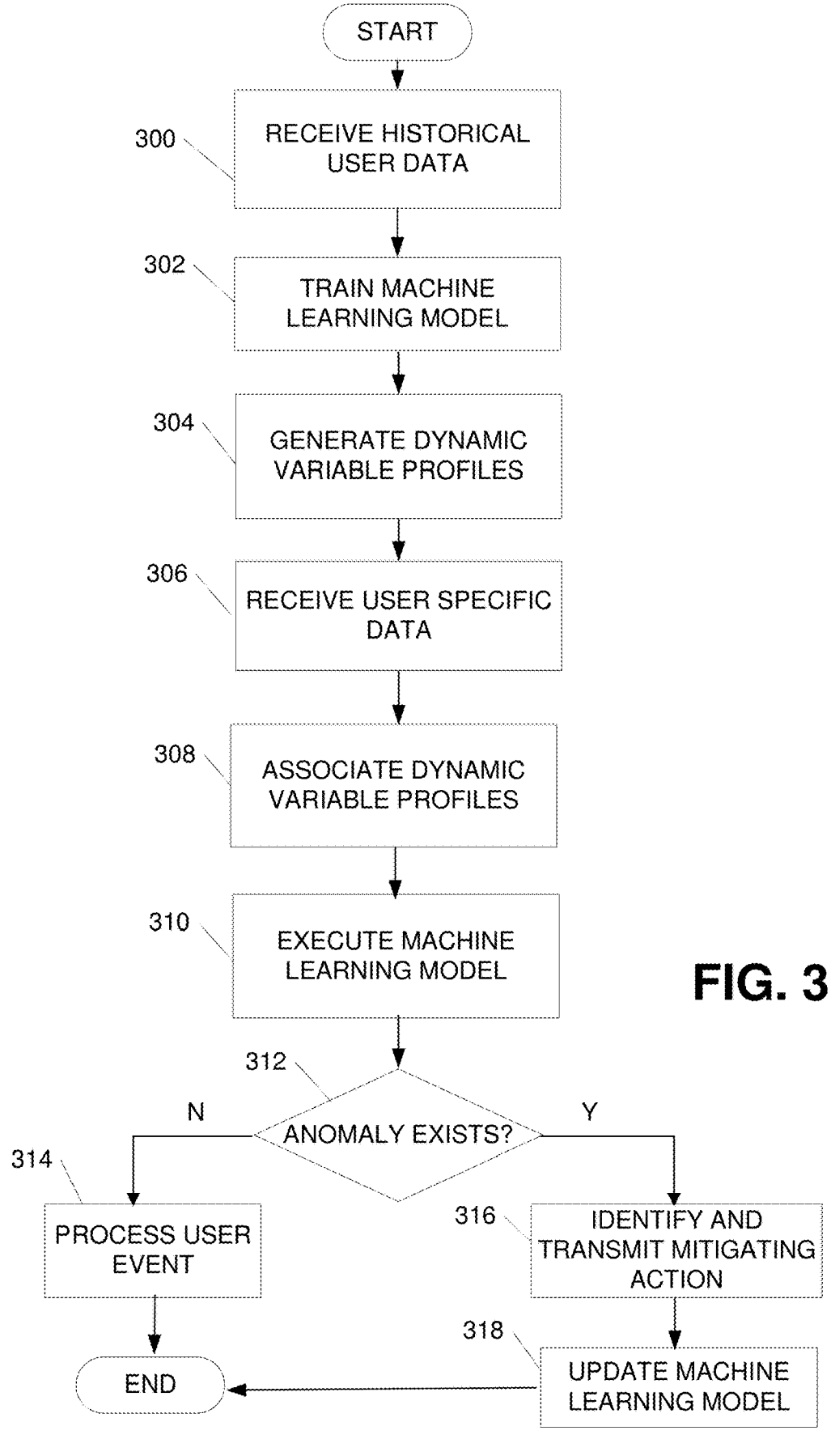
FIG. 3 depicts an illustrative method for implementing dynamic variable determination and labeling in accordance with one or more aspects described herein.

FIG. 3 is a flow chart illustrating one example method of dynamic variable determination and labeling in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, a computing platform may receive, from a plurality of data sources, historical user data. For instance, user data associated with transaction histories, products and services obtained, public records, and the like, may be received by the computing platform 110. Accordingly, the plurality of data sources may include self-provided data (e.g., data from a user), internal data sources, and/or external data sources.

At step 302, the computing platform may train a machine learning model using the received historical data. For instance, the machine learning model may be trained to generate a plurality of dynamic variable profiles. In some examples, each profile of the plurality of dynamic variable profiles may be associated with a user variable. The machine learning model may also be trained to evaluate user specific data for potential unauthorized activity or anomalies based on the plurality of dynamic variable profiles.

At step 304, the plurality of dynamic variable profiles may be generated by the machine learning model.

At step 306, user specific data for a user may be received by the computing platform. For instance, a user may request a user event. The request for the user event may include user identifying data, event identifying data (e.g., type, account, amount, or the like), and the like.

At step 308, one or more dynamic variable profiles of the plurality of dynamic variable profiles may be associated with the user. For instance, based on user identifying data and/or other data, one or more dynamic variable profiles that align with one or more variables of the user may be identified and associated with the user. Accordingly, as data for the user is processed, the associated dynamic variable profiles may be used in analyzing the data for potential unauthorized activity.

At step 310, the computing platform may execute the machine learning model. For instance, the user specific data (e.g., user identifying data, event identifying data, and the like) and associated dynamic variable profiles for the user may be input into the machine learning model. Upon execution of the machine learning model, the model may output a determination of whether an anomaly was detected in the user specific data (e.g., as compared to the associated dynamic variable profiles) which may indicate unauthorized activity or potential unauthorized activity.

At step 312, a determination may be made as to whether an anomaly exists or was detected. If not, at step 314, the requested user event may be processed.

If, at step 312, an anomaly is detected, the user and/or user event may be flagged as potentially unauthorized activity in step 316. In some examples, flagging the user and/or user event may include identifying one or more mitigating actions. In some examples, identifying the one or more mitigating actions may include identifying a category of user (e.g., existing customer, potential customer) associated with the detected anomaly, identifying a category of data associated with the detected anomaly (e.g., self-provided, internal, external), or the like. In some arrangements, the identified one or more mitigating actions may be based on the identified category of user or data. In some examples, the identified mitigating action may include denying the requested user event, limiting access to one or more accounts of a user, or the like. The identified one or more mitigating actions may be transmitted to one or more computing devices. In some examples, transmitting the one or more mitigating actions may cause the one or more computing devices to execute the one or more mitigating actions.

At step 318, the computing platform may update the machine learning model based on the detected anomaly and one or more mitigating actions. Accordingly, the machine learning model may be continuously updated to provide improved accuracy in detecting potential unauthorized activity.

As discussed herein, aspects described are directed to identify, in real-time or near real-time, potential unauthorized activity in event processing requests. By evaluating event and user data, using machine learning and dynamic variable profiles that are associated with the particular user, anomalies in data that may indicate unauthorized activity may be quickly detected. The data may be analyzed at a granular level to enable identification of anomalies even in minor aspects of data provided, or based on a context of the data or user. For instance, the dynamic variable profiles may be built or generated to identify expected actions within a context. Accordingly, in analyzing user data in light of associated dynamic variable profiles, while data received may seem legitimate, if it does not comply based on the context identified via the dynamic variable profile, it may be flagged as potential unauthorized activity. Thus, anomalous data that would otherwise not be identified (e.g., because the data may, for instance, be legitimate data being used in a synthetic identity) may be efficiently identified and addressed to mitigate impact to the user.

Although aspects described herein are directed to requests for user events received via an online or mobile application, the aspects described may be used to evaluate all channels of event requests, including telephone requests, in-person requests, and the like. For instance, information provided to a customer service associate may be fed into the dynamic variable control computing platform (e.g., via an associate computing device) and analyzed to detect potential unauthorized activity.

Further, in some arrangements, the channel through which the event request was received may be a factor in identifying a mitigating action or identifying potential unauthorized activity. For instance, online event requests may include more inherent risk than phone requests. Accordingly, anomalies detected may be more likely to trigger a mitigating action or more severe mitigating action. Accordingly, in some examples, a risk factor associated with a channel through which the event request was received (e.g., mobile, online, phone, or the like) may be determined and used to identify a mitigating action.

As discussed herein, dynamic variable profiles may be generated for various user variables. For instance, knowledge of information related to a stage of life of user (e.g., retired, young couple, new parent, or the like) may be used to generate or associate a dynamic variable profile identifying expected events for that user. Profiles may also be generated or associated with a user based on job context (e.g., area in which a user works), job role, education profile, and the like.

For instance, if a user has a degree in data science and is opening web services accounts, that may be an expected part of a job function, as identified in the dynamic variable profile for that user's job role. However, if the user has an unrelated background or job, this may indicate the user's identity or other personal data is being used in a synthetic identity.

For instance, a user who handles marketing for an entity may register a plurality of domain names in the course of their work. This may be an expected function in the dynamic variable profile associated with that user. However, a user in an unrelated field registering a plurality of domain names may indicate potential unauthorized activity.

In another example, opening an education savings account may be an expected activity for young adults who have kids, but for a user who is a teenager or retired it may indicate unauthorized activity. Accordingly, analyzing the data using the dynamic variable profile for young adults with kids might not flag the new account, but analyzing the data using the dynamic variable profile for a teenager or retiree may flag this as potential unauthorized activity.

Various other examples may be used without departing from the invention.

As discussed herein, the machine learning model may be trained using historical user data. Accordingly, the greater the volume of training data, the more accurate the dynamic variable profiles will be and the more accurate the data analysis to detect unauthorized activity will be. Accordingly, existing customers may have a large volume of data for use in building profiles and analyzing data, while potential customers may have less data available. Further, potential customers may rely more heavily on external or publicly available data (e.g., real estate records, tax records, social media data, and the like).

In some examples, types of data may be ranked by expected validity, which may then be used in the analysis of data or identification of mitigating actions. For instance, data that is self-provided may be given a higher priority than data from external sources. Accordingly, issues or anomalies detected in self-reported or provided data may be given greater attention (e.g., more serious mitigating actions) then anomalies in external data.

As discussed herein, a feedback loop may be used to update, validate or refine the machine learning model. Accordingly, as events are processed or denied, that data is fed back into the model to continuously improve the accuracy of the model.

In some examples, the arrangements described herein enable heightened scrutiny of events associated with members of vulnerable populations. Accordingly, to ensure vulnerable users are not victims of unauthorized activity, additional scrutiny or additional mitigating actions may be applied.

Further, while aspects described herein are directed to associating one or more dynamic variable profiles with a user, the assignment of profiles may be dynamic and may change with time, change in family status, change in job, or the like. Accordingly, while an initial event outside of a current dynamic variable profile may trigger a mitigating action, if the user then shows that the event is not unauthorized activity, the profiles associated with the user may be modified or updated to more accurately assess data for the updated variable associated with that user.

In some arrangements, the dynamic variable profiles may also account for time of day, day of week, season, or the like, in identifying expected events for a user. Accordingly, an event that may be expected during daytime hours occurring after hours may trigger a mitigating action.

In some examples, the identified mitigating actions may include denying the requested event (e.g., denying a request for withdrawal, account opening, or the like), limiting access to one or more other user accounts (e.g., limiting amount of withdrawals permitted, preventing withdrawals, or the like). In some examples, the mitigating action may remain in effect until a triggering event occurs. For instance, a user may provide additional information indicating that the requested event was not unauthorized activity and that may trigger removal of a mitigating action. In some examples, the triggering event may include requesting the user to visit a banking center and provide photo identification, biometric data, or the like to a banking associate. In another example, the user may be contact via a pre-registered contact system (e.g., an address, phone number or the like, provided by the user prior to the event request). The user may be contacted via the pre-registered system to confirm an identity of the user. In some examples, an analyst may further investigate the potential unauthorized activity and, upon concluding the activity was not unauthorized, may remove the mitigating action.

Figure 4:
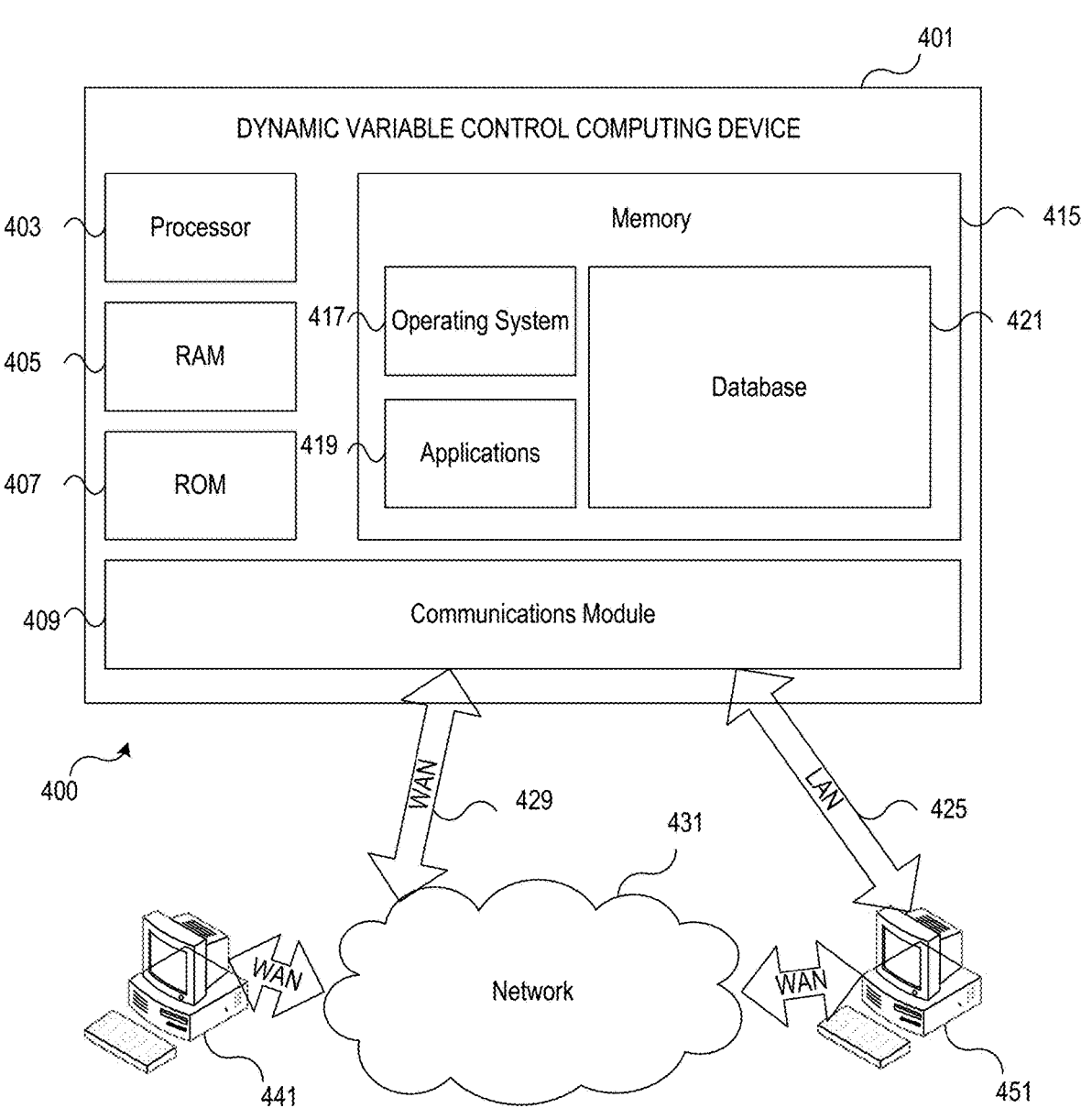
FIG. 4 illustrates one example environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include dynamic variable control computing device 401 having processor 403 for controlling overall operation of dynamic variable control computing device 401 and its associated components, including Random Access Memory (RAM) 405, Read-Only Memory (ROM) 407, communications module 409, and memory 415. Dynamic variable control computing device 401 may include a variety of computer readable media. Computer readable media may be any available media that may be accessed by dynamic variable control computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by dynamic variable control computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on dynamic variable control computing device 401. Such a processor may execute computer-executable instructions stored on a computer-readable medium.

Software may be stored within memory 415 and/or storage to provide instructions to processor 403 for enabling dynamic variable control computing device 401 to perform various functions as discussed herein. For example, memory 415 may store software used by dynamic variable control computing device 401, such as operating system 417, application programs 419, and associated database 421. Also, some or all of the computer executable instructions for dynamic variable control computing device 401 may be embodied in hardware or firmware. Although not shown, RAM 405 may include one or more applications representing the application data stored in RAM 405 while dynamic variable control computing device 401 is on and corresponding software applications (e.g., software tasks) are running on dynamic variable control computing device 401.

Communications module 409 may include a microphone, keypad, touch screen, and/or stylus through which a user of dynamic variable control computing device 401 may provide input, and may also include one or more of a speaker for providing audio output and a video display device for providing textual, audiovisual and/or graphical output. Computing system environment 400 may also include optical scanners (not shown).

Dynamic variable control computing device 401 may operate in a networked environment supporting connections to one or more other computing devices, such as computing device 441 and 451. Computing devices 441 and 451 may be personal computing devices or servers that include any or all of the elements described above relative to dynamic variable control computing device 401.

The network connections depicted in FIG. 4 may include Local Area Network (LAN) 425 and Wide Area Network (WAN) 429, as well as other networks. When used in a LAN networking environment, dynamic variable control computing device 401 may be connected to LAN 425 through a network interface or adapter in communications module 409. When used in a WAN networking environment, dynamic variable control computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:

at least one processor;

a communication interface communicatively coupled to the at least one processor; and a memory storing computer-readable instructions that, when executed by the at least one processor, cause the computing platform to:

receive historical user data from a plurality of data sources;

train, using the historical user data, a machine learning model to generate a plurality of dynamic variable profiles applicable to a plurality of users, each profile of the dynamic variable profiles being associated with a different user variable, and evaluate data for potential unauthorized activity based on the plurality of dynamic variable profiles;

receive user specific data for a user, wherein the user specific data includes data associated with a requested user event;

associate one or more dynamic variable profiles of the plurality of dynamic variable profiles with the user, wherein associating the one or more dynamic variable profiles with the user includes identifying one or more first categories associated with the user based on at least a job role of the user, identifying one or more user variables associated with each first category of the one or more first categories, and identifying the one or more dynamic variable profiles associated with the identified one or more user variables associated with each first category of the one or more first categories associated with the user;

execute, using the user specific data and the associated one or more dynamic variable profiles as inputs, the machine learning model to detect an anomaly in at least one dynamic variable profile;

responsive to not detecting an anomaly, process the requested user event; and responsive to detecting an anomaly, flag the user and requested user event as potentially unauthorized, wherein flagging includes:

identifying a mitigating action; and transmitting the mitigating action to one or more computing devices, wherein transmitting the mitigating action to one or more computing devices causes the one or more computing devices to execute the mitigating action; and update the machine learning model based on the detected anomaly and the identified mitigating action.

2. The computing platform of claim 1, wherein identifying the mitigating action further includes:

identifying a second category associated with the user; and identifying the mitigating action based on the second category of the user.

3. The computing platform of claim 2, wherein the second category associated with the user on which the identifying the mitigating action is based is one of: current customer or potential customer.

4. The computing platform of claim 1, wherein identifying the mitigating action further includes:

identifying a category of data associated with the detected anomaly; and identifying the mitigating action based on the category of data.

5. The computing platform of claim 4, wherein the category of data includes one of: self-provided data, internal data or external data.

6. The computing platform of claim 1, wherein the mitigating action includes at least one of: denying the requested user event or limiting access to a user account.

7. The computing platform of claim 1, wherein the user specific data includes a type of event.

8. The computing platform of claim 1, wherein the plurality of data sources includes internal data sources and external data sources.

9. A method, comprising:

receiving, by a computing platform, the computing platform having at least one processor and memory, and from a plurality of data sources, historical user data;

training, by the at least one processor and using the historical user data, a machine learning model to generate a plurality of dynamic variable profiles applicable to a plurality of users, each profile of the dynamic variable profiles being associated with a different user variable, and evaluate data for potential unauthorized activity based on the plurality of dynamic variable profiles;

receiving, by the at least one processor, user specific data for a user, wherein the user specific data includes data associated with a requested user event;

associating, by the at least one processor, one or more dynamic variable profiles of the plurality of dynamic variable profiles with the user, wherein associating the one or more dynamic variable profiles with the user includes identifying one or more first categories associated with the user based on at least a job role of the user, identifying one or more user variables associated with each first category of the one or more first categories, and identifying the one or more dynamic variable profiles associated with the identified one or more user variables associated with each first category of the one or more first categories associated with the user;

executing, by the at least one processor and using the user specific data and the associated one or more dynamic variable profiles as inputs, the machine learning model to detect an anomaly in at least one dynamic variable profile;

responsive to not detecting an anomaly, processing, by the at least one processor, the requested user event; and responsive to detecting an anomaly, flagging, by the at least one processor, the user and requested user event as potentially unauthorized, wherein flagging includes:

identifying, by the at least one processor a mitigating action; and transmitting, by the at least one processor, the mitigating action to one or more computing devices, wherein transmitting the mitigating action to one or more computing devices causes the one or more computing devices to execute the mitigating action; and updating, by the at least one processor, the machine learning model based on the detected anomaly and the identified mitigating action.

10. The method of claim 9, wherein identifying the mitigating action further includes:

identifying, by the at least one processor, a second category associated with the user; and identifying, by the at least one processor, the mitigating action based on the second category of the user.

11. The method of claim 10, wherein the second category associated with the user on which the identifying the mitigating action is based is one of: current customer or potential customer.

12. The method of claim 9, wherein identifying the mitigating action further includes:

identifying, by the at least one processor, a category of data associated with the detected anomaly; and identifying, by the at least one processor, the mitigating action based on the category of data.

13. The method of claim 12, wherein the category of data includes one of:

self-provided data, internal data or external data.

14. The method of claim 9, wherein the mitigating action includes at least one of: denying the requested user event or limiting access to a user account.

15. The method of claim 9, wherein the user specific data includes a type of event.

16. The method of claim 9, wherein the plurality of data sources includes internal data sources and external data sources.

17. One or more non-transitory computer-readable media storing instructions that, when executed by a computing platform comprising at least one processor, memory, and a communication interface, cause the computing platform to:

receive historical user data from a plurality of data sources;

train, using the historical user data, a machine learning model to generate a plurality of dynamic variable profiles applicable to a plurality of users, each profile of the dynamic variable profiles being associated with a different user variable, and evaluate data for potential unauthorized activity based on the plurality of dynamic variable profiles;

receive user specific data for a user, wherein the user specific data includes data associated with a requested user event;

associate one or more dynamic variable profiles of the plurality of dynamic variable profiles with the user, wherein associating the one or more dynamic variable profiles with the user includes identifying one or more first categories associated with the user based on at least a job role of the user, identifying one or more user variables associated with each first category of the one or more first categories, and identifying the one or more dynamic variable profiles associated with the identified one or more user variables associated with each first category of the one or more first categories associated with the user;

execute, using the user specific data and the associated one or more dynamic variable profiles as inputs, the machine learning model to detect an anomaly in at least one dynamic variable profile;

responsive to not detecting an anomaly, process the requested user event; and responsive to detecting an anomaly, flag the user and requested user event as potentially unauthorized, wherein flagging includes:

identifying a mitigating action; and transmitting the mitigating action to one or more computing devices, wherein transmitting the mitigating action to one or more computing devices causes the one or more computing devices to execute the mitigating action; and update the machine learning model based on the detected anomaly and the identified mitigating action.

18. The one or more non-transitory computer-readable media of claim 17, wherein identifying the mitigating action further includes:

identifying a second category associated with the user; and identifying the mitigating action based on the second category of the user.

19. The one or more non-transitory computer-readable media of claim 18, wherein the second category associated with the user on which the mitigating action is based is one of: current customer or potential customer.

20. The one or more non-transitory computer-readable media of claim 17, wherein identifying the mitigating action further includes:

identifying a category of data associated with the detected anomaly; and identifying the mitigating action based on the category of data.

21. The one or more non-transitory computer-readable media of claim 20, wherein the category of data includes one of: self-provided data, internal data or external data.

* * * * *